(12) United States Patent
Prokhorov

(10) Patent No.: US 8,254,670 B2
(45) Date of Patent: Aug. 28, 2012

(54) SELF-LEARNING OBJECT DETECTION AND CLASSIFICATION SYSTEMS AND METHODS

(75) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 848 days.

(21) Appl. No.: 12/392,379

(22) Filed: Feb. 25, 2009

(65) Prior Publication Data
US 2010/0215254 A1 Aug. 26, 2010

(51) Int. Cl.
*G06K 9/62* (2006.01)
(52) U.S. Cl. ........................................................ 382/159
(58) Field of Classification Search .................... 382/159
See application file for complete search history.

(56) References Cited

U.S. PATENT DOCUMENTS

| | | | |
|---|---|---|---|
| 5,161,107 A | 11/1992 | Mayeaux et al. | |
| 5,433,927 A | 7/1995 | Brady et al. | |
| 5,448,484 A | 9/1995 | Bullock et al. | |
| 6,121,898 A | 9/2000 | Moetteli | |
| 6,687,386 B1* | 2/2004 | Ito et al. | 382/103 |
| 6,734,787 B2 | 5/2004 | Ikeda | |
| 6,801,662 B1 | 10/2004 | Owechko et al. | |
| 6,889,171 B2 | 5/2005 | Skrbina et al. | |
| 7,263,209 B2 | 8/2007 | Camus et al. | |
| 7,395,151 B2 | 7/2008 | O'Neill et al. | |
| 2004/0201672 A1* | 10/2004 | Varadarajan et al. | 348/148 |
| 2005/0149251 A1* | 7/2005 | Donath et al. | 701/200 |
| 2006/0167784 A1 | 7/2006 | Hoffberg | |
| 2006/0198554 A1* | 9/2006 | Porter et al. | 382/159 |
| 2007/0152804 A1* | 7/2007 | Breed et al. | 340/435 |
| 2008/0051957 A1 | 2/2008 | Breed et al. | |
| 2008/0100704 A1 | 5/2008 | Venetianer et al. | |
| 2009/0195371 A1* | 8/2009 | Camus | 340/435 |
| 2009/0322871 A1* | 12/2009 | Ji et al. | 348/115 |
| 2010/0061624 A1* | 3/2010 | Cobb et al. | 382/157 |

OTHER PUBLICATIONS

Fei-Fei et al, Learning Generative Visual Models from Few Training Examples: An Incremental Bayesian Approach Tested on 101 Object Categories, undated, pp. 1-9 (no other identifying information available).

* cited by examiner

*Primary Examiner* — Bhavesh Mehta
*Assistant Examiner* — Nirav G Patel
(74) *Attorney, Agent, or Firm* — Dinsmore & Shohl LLP

(57) ABSTRACT

A method of object classification based upon fusion of a remote sensing system and a natural imaging system is provided. The method includes detecting an object using the remote sensing system. An angle of view of a video camera of the natural imaging system is varied. An image including the object is generated using the natural imaging system. The natural imaging system may zoom in on the object. The image represented in either pixel or transformed space is compared to a plurality of templates via a competition based neural network learning algorithm. Each template has an associated label determined statistically. The template with a closest match to the image is determined. The image may be assigned the label associated with the relative location of the object, the relative speed of the object, and the label of the template determined statistically to be the closest match to the image.

20 Claims, 7 Drawing Sheets

SELF-LEARNING OBJECT DETECTION AND CLASSIFICATION SYSTEMS AND METHODS

TECHNICAL FIELD

The present invention generally relates to object classification systems and methods and, more specifically, to systems and methods of object classification having self-learning capabilities.

BACKGROUND

Driving a vehicle generally requires an understanding of the complex road environment. Various objects and signals, such as signs, lights, pedestrians and other vehicles play a role in driving. It has been suggested that driving systems require a developmental approach, wherein a suitable developmental architecture, coupled with a nurturing and challenging environment, as experienced through sensors and effectors, allows mental capabilities and skill to emerge.

However, current object recognition technology in a vehicle is generally programmed prior to deployment in the vehicle. A need exists for object classification systems and methods having the capacity for self-learning.

SUMMARY

In one embodiment, a method of object classification includes generating an image using a natural imaging system, detecting an object displayed in the image using a remote sensing system, mapping a return of the remote sensing system with the image, comparing the image to a plurality of templates, each template having an associated label, determining which of the plurality of templates is a closest match to the image represented in pixel or transformed space, and assigning the label to the image associated with the template determined to be the closest match to the image represented in pixel or transformed space.

In another embodiment, an object classification system includes a natural imaging system that generates an image. A remote sensing system detects an object displayed in the image using a remote sensing system. A computer-implemented algorithm maps a return of the remote sensing system with the image. A learning and categorization system includes logic that (i) compares the image represented in pixel or transformed space to a plurality of templates, each template having an associated label, (ii) determines which of the plurality of templates is a closest match to the image represented in pixel or transformed space and (iii) assigns the label to the image associated with the template determined to be the closest match to the image represented in pixel or transformed space.

In another embodiment, a vehicle comprising an image classification system includes a global positioning system and a remote detection system configured to provide a return for a target object within a range of the remote detection system. A natural imaging system includes a video camera for providing an image of the target object. A computer-implemented algorithm associates the return of the remote detection system with the image of the natural imaging system using a perspective mapping transformation. A learning and categorization system classifies the image using information from the global positioning unit.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
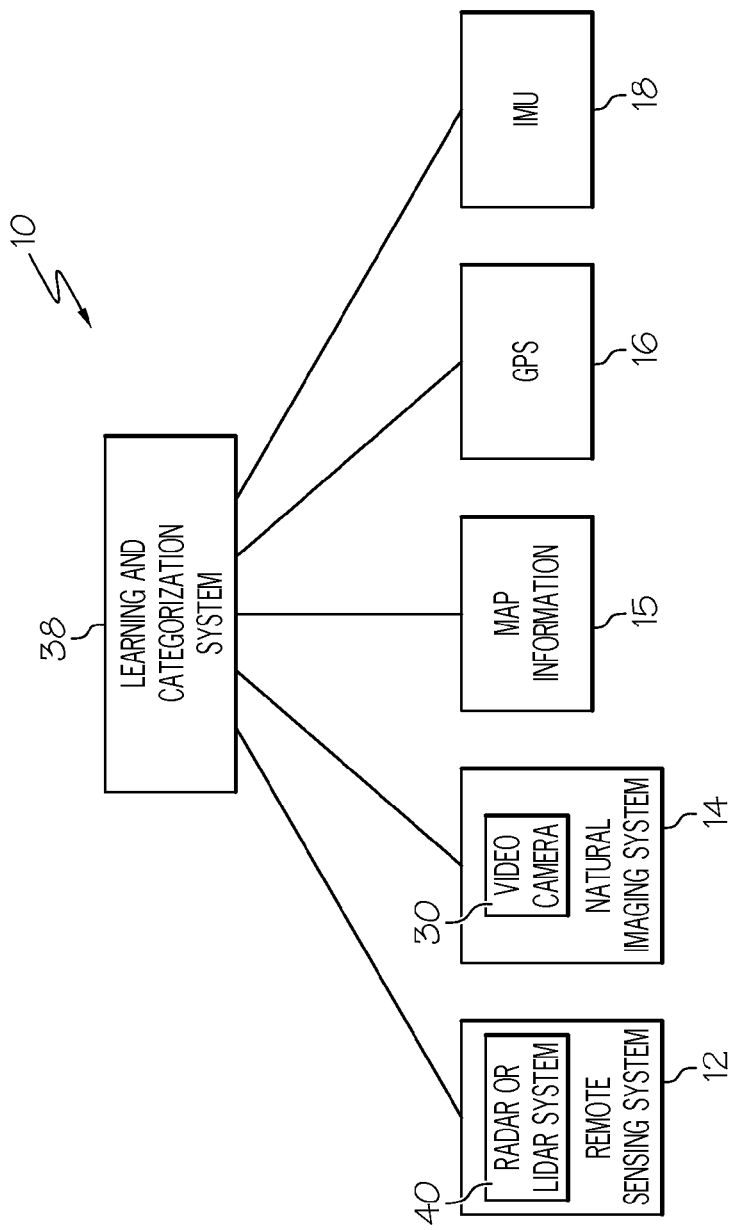
FIG. 1 is a schematic illustrating an embodiment of a system and method for object detection using a learning and categorization system.

Referring to FIG. 1, an object recognition system 10 for object classification includes a remote sensing system 12 (e.g., including a radar or LIDAR system 40), a natural imaging system 14 (e.g., including a video camera 30), map information 15 and a global positioning system 16 (GPS). An inertial measuring unit 18 (IMU) may also be provided. The object recognition system 10 utilizes an object learning and categorization system 38 for classifying objects identified using the remote sensing system 12. Information from the GPS 16, map 15 and IMU 18 may also be used for automatic selection of high-confidence class labels and for training of the object recognition system 10. The object recognition system 10 may be used with a vehicle. A vehicle including the object recognition system 10 is referred to herein as an "ego-vehicle." The object recognition system 10 including the remote sensing system 12, natural imaging system 14, map 15, GPS 16 and IMU 18 may be suitable for detecting objects within the driving environment of the ego-vehicle and/or making suitable measurements of the object detected and/or the ego-vehicle.

Figure 2:
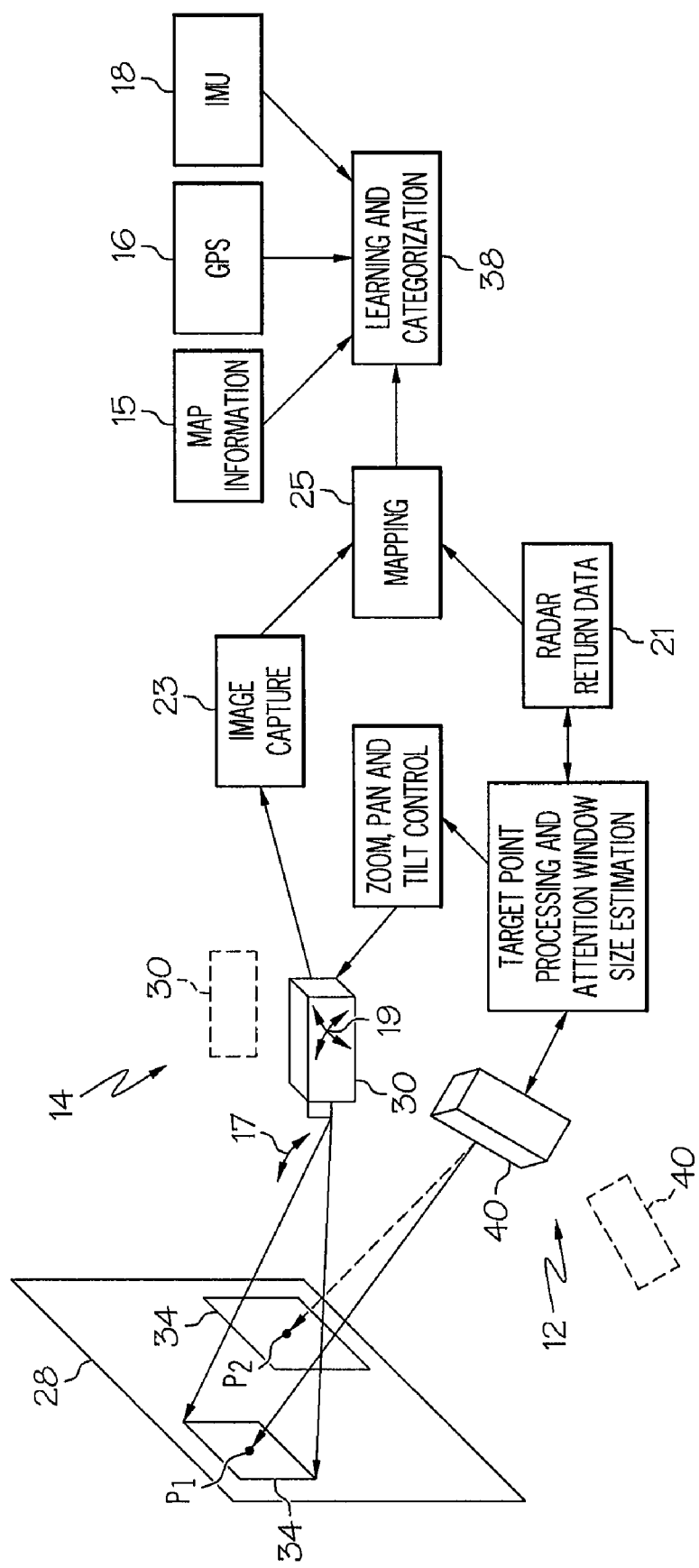
FIG. 2 is another schematic illustrating an embodiment of a system and method for object detection using a learning and categorization system.

Referring to FIG. 2, the remote sensing system 12 may be capable of identifying one or multiple objects within an original image 28 taken by the natural imaging system 14. One exemplary radar system for use with the remote sensing system 12 may have a range between about two meters to about 150 meters with a tolerance of +/− one meter; an angle of at least about 15 degrees with a tolerance of about ±0.3 degrees, and a speed of ±56 m/s with a tolerance of about ±0.75 m/s.

The natural imaging system 14 may include a video camera system including one or more video cameras. An exemplary video camera system may have a refreshing rate of about 14 Hz, a field of view of about 45 degrees and a resolution of about 320×240 pixels. The video camera may have zoom capabilities 17 and attitude (pan and tilt) control 19.

The combination of the remote sensing system 12 and natural imaging system 14 can be an efficient way to perform coarse attention selection. The remote imaging system 12 may be used to find salient image regions corresponding to possible nearby objects within an original image 28. Candidate attention points $P_1$ and $P_2$ may correspond to target objects detected by the remote sensing system 12 and represent radar-centered coordinates projected onto the image reference system. Kalman filtering may be applied to the radar returns to generate fused target points from a group of target points in 3D world coordinates. For purposes of illustration, the attention points $P_1$ and $P_2$ are represented by two spaced-apart dots in an original image 28. Particularly, the original image 28 captured by the natural imaging system 14 may first be taken with a pre-selected minimum zoom factor thereby forming the relatively wider angle original image 28. As shown in FIG. 2, the remote sensing system 12 may apply attention points $P_1$ and $P_2$ to the original image 28.

Once the attention points $P_1$ and $P_2$ are determined and identified in the original image 28, a suitable optical zoom factor to create attention windows 34 may then be selected based on, for example, a range measurement from the remote sensing system 12 to the target object and/or expected size of the target object. Any suitable criteria for selecting the optical zoom factor may be used. In some instances, this selection of a suitable zoom factor may include an attention window size estimation. In other words, the zoom factor may be selected to correspond to an attention window size. For example, if a determination is being made between vehicles and non-vehicles, the attention window size may correspond to an average vehicle size. However, the object recognition system 10 may be used to provide a wide range of classifications and the size of the attention window and the chosen zoom factor may be tailored accordingly. The attention windows 34 are generally smaller in area than the original image 28. The video camera 30 may be zoomed in on one of $P_1$ and $P_2$ in accordance with the zoom factor and that image captured and saved in memory. The captured image may be provided to the learning and categorization system 38 for categorization and object learning and the process may be repeated for all attention points in the original image 28. It should be noted that while the attention windows 34 are illustrated as being spaced-apart, they could overlap. Additionally, there may be more or less than two attention points and therefore more or less than two attention windows in the original image.

In another embodiment, the remote sensing system 12 may include multiple radar systems (represented by dashed lines 40) and the natural imaging system 14 may include multiple video cameras (represented by dashed lines 30). For example, one video camera 30 might provide the original image 28, while the second video camera 30 functions in zooming mode to zoom in on the detected objects. In embodiments having multiple radar systems 40, one radar system 40 may be used for short range object detection and another radar system 40 may be used for long range object detection.

In addition, in another embodiment, instead of or in addition to using the above-described zoom feature, the object recognition system 10 may select the attention window 34 as its input without applying the selected zoom factor(s). Applying the selected zoom factor(s), however, can provide similar or the same level of image resolution for relatively distant and relatively nearby objects. The same level of image resolution can be advantageous for performance consistency (i.e., independence from distance to the object of interest).

Referring again to FIG. 2, the object recognition system 10 may fuse the radar returns 21 with camera images 23. The radar returns 21 may be projected onto an image system reference plane using a perspective mapping transformation 25. A processor may fuse the radar return with the camera image 23 using an algorithm which performs the necessary mapping transformation 25. The perspective mapping transformation 25 may be performed using calibration data that contains intrinsic and extrinsic parameters of the video camera 30.

The map information 15, GPS 16 and/or IMU 18 can provide additional information to the learning and categorization system 38 relating to location of the ego-vehicle and target objects, heading of the ego-vehicle and target objects, etc. The map information 15 may include electronic information about an area, such location of streets, landmarks, buildings, bodies of water, etc. The map information 15 may be saved in memory. The GPS 16 may include a GPS receiver with an antenna, tuned to the frequencies transmitted by the satellites, receiver-processors, and a highly-stable clock. The GPS 16 may also include a display for providing location and speed information to a user. The IMU 18 senses motion including the type, rate, and direction of that motion of the ego-vehicle and may use a combination of accelerometers and gyroscopes.

Figure 3:
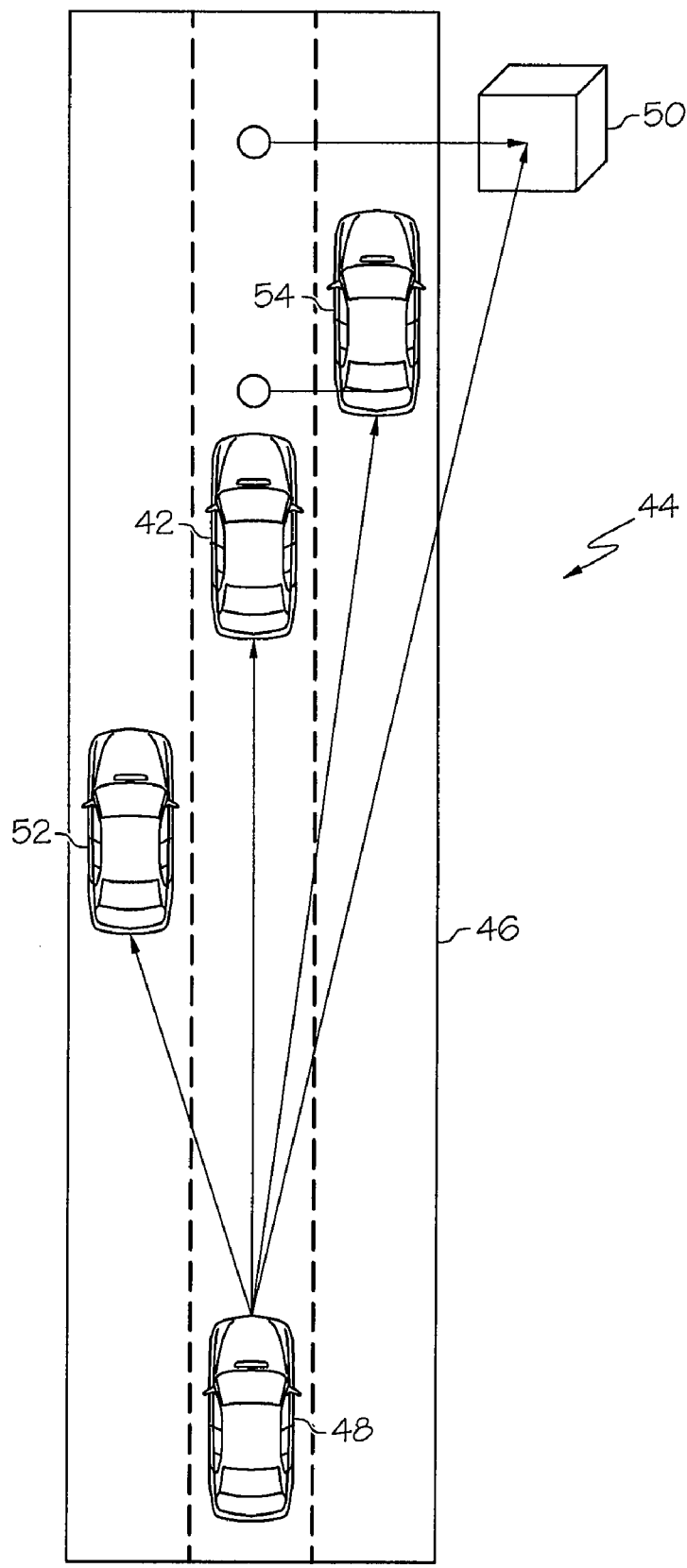
FIG. 3 is a schematic top view illustrating object detection and placement from an ego-vehicle.

Referring to FIG. 3, an object 42, which returns a sufficiently strong radar/LIDAR reflection in a reasonably wide range can be reliably positioned on a map 44, even if a road 46 curves, provided that the position of the ego-vehicle 48 on the map is known (e.g., using the GPS 16). As can be seen, the object 50 is off the road 46, while objects 42, 52 and 54 are on the road. The map information 15, GPS 16 and IMU 18 can be used by the learning and categorization system 38 in classifying the target objects.

The learning and categorization system 38 can use any suitable learning algorithm which uses images of objects as its inputs. For example, the learning and categorization system 38 may acquire as its input one of the attention windows 45 or one of the zoomed in images as described above with reference to FIG. 2. From a learning standpoint, it may be useful for the object detection system 10 to operate on a principle of competition among its components, which will be described in greater detail below.

Figure 4:
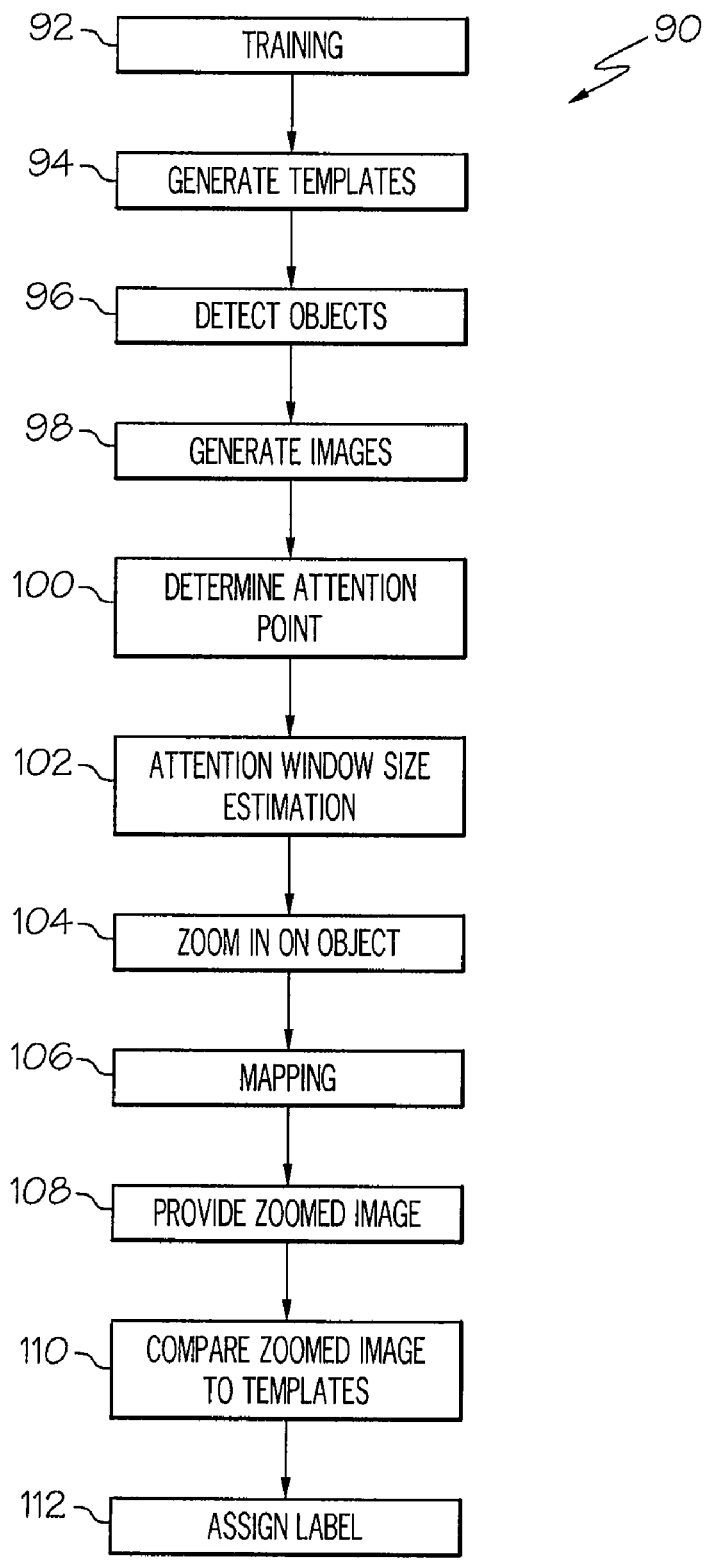
FIG. 4 is a schematic illustrating an embodiment of a process for system operation.

Referring to FIG. 4, a process 90 for classifying objects using images is illustrated. At step 92, the object recognition system 10 is initially trained by providing a number of training images whose classifications are known and input to the learning and categorization system 38. The training images may be from a collection of known images specifically selected to facilitate the training process. At step 94, the learning and categorization system 38 uses the training images to generate a number of templates for each class and associate the templates with components. Once the ego-vehicle is deployed, the remote sensing system 12 detects one or more objects at step 96 and an original image is generated of the one or more objects using the natural imaging system 14 at step 98. At step 100, an attention point is determined, which may represent radar-centered coordinates projected onto the image reference system. An attention window size estimation may be performed at step 102 and the natural imaging system 14 may optically zoom in on the attention point, and that image is captured at step 104. At step 106, the radar-centered coordinates are projected into the image reference system using the perspective mapping transformation. In some instances, the radar-centered coordinates may be projected onto the original image prior to zooming. At step 108, the image is provided to the learning and categorization system 38. The image is compared to the templates to determine which template is the closest match to the image at step 110. Once the closest match is determined, a label associated with that template is assigned to the image at step 112.

Figure 5:
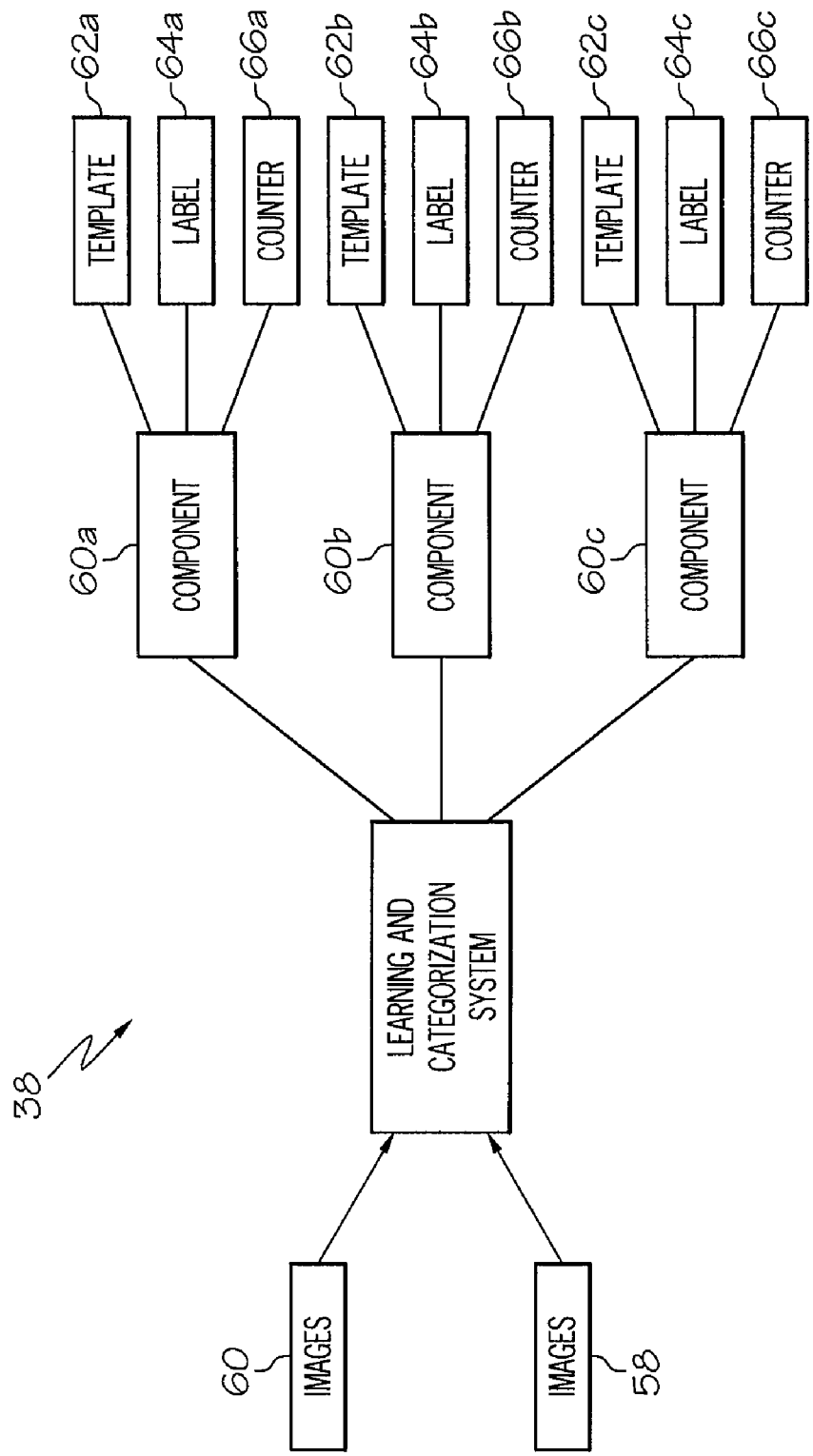
FIG. 5 is a schematic illustrating an embodiment of a learning and categorization system.

FIG. 5 is a simplified representation of a learning and categorization system 38 where the learning and categorization system is initially trained with a collection of images 58.

A new image 61 is applied to the input of the learning and categorization system 38, for example, in a transformed space (i.e., not directly as pixel intensities, but as some features, e.g., a histogram of intensities, oriented gradients, etc.). The transformed space may be linked in one-to-one correspondence to the image space (i.e., the input image can correspond to a specific counterpart in the transformed space and vice versa). When the new image is applied to the input of the learning and categorization system 38, the new image is compared with stored images in the transformed space. For comparison purposes, a semantic analysis of the input image may be utilized, for example, as described in Fei-Fei Li, Robert Fergus, Pietro Perona, "Learning generative visual models from few training examples: An incremental Bayesian approach tested on 101 object categories," *Computer Vision and Image Understanding*, Vol. 106, 2007, pp. 59-70.

Still referring to FIG. 5, each component 60a-60c of the learning and categorization system 38 may store a unique template 62a-62c with an associated label 64a-64c. Only three components 60a-60c are shown for illustrative purposes. There may be hundreds or thousands of components with associated templates and labels. The templates 62a-62c may be a composite of images in the transformed space for which the components 60a-60c turned out to be a winner (i.e., a closest match) of a competition among the components. The component 60a-60c with the highest match with the input image is the winner and the label 64a-64c associated with the winning component may be assigned to the input image. The winning component 60a-60c may adjust its template 62a-62c to better match the existing template with the input image. Each component 60a-60c may also have an associated counter 66a-66c or group of counters. Each counter 66a-66c is assigned to a class of images and gets incremented each time the associated component 60a-60c wins.

Figure 6:
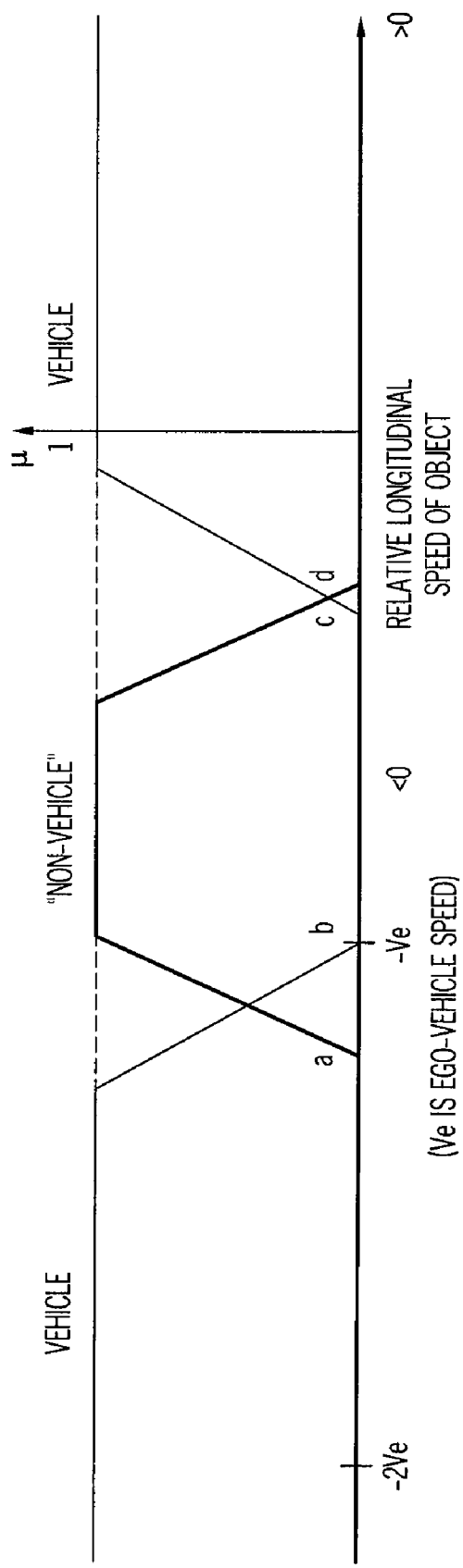
FIG. 6 is a schematic illustrating an embodiment of a fuzzy logic decision system.

Referring to FIG. 6, relative speed of the target object, a measurement that can be provided using the remote sensing system 12, may be used in classifying the target object. Relative speed measurements may be useful in determining whether the target object is to be labeled a "vehicle" or a "non-vehicle." For example, if the target object is determined to be on the road (e.g., using the remote sensing system 12 and the map information 15 and the GPS 16) and moving with a speed comparable to that of the ego-vehicle, then the target object may be labeled a vehicle with relatively high confidence. If the target object is determined to be off the road and moving in a direction opposite to the ego-vehicle, the target object may be provisionally labeled a non-vehicle. A special classifier or decision logic may be utilized to aid object labeling based on the relative speed and location of the target object. A fuzzy logic inference can be applied as illustrated in FIG. 6. The target object having a negative speed −Ve might be a non-vehicle. However, the target object having negative speeds much larger than −Ve (e.g., around −2Ve) are likely vehicles.

FIG. 6 is a simplified illustration of a decision logic based on linguistic variables (vehicle and provisional non-vehicle, or "non-vehicle"). The decision is based on computation of the degree of membership μ and selection of a maximum for the two classes (vehicle and provisional non-vehicle, or "non-vehicle") depending on relative longitudinal speed. Negative speeds indicate movement toward the ego-vehicle and positive speeds indicate movement away from the ego-vehicle.

A bank of decision logic elements may be provided for classification based on the relative speed and the absolute speed of the ego-vehicle. Such logic elements may have values for parameters a, b, c and d, which may be calculated from experimental data. A learning system which is trained on temporal information may be used. For example, for a vehicle accelerating from full stop in the opposite lane from the ego-vehicle, one may use temporal information to differentiate the vehicle from non-vehicles.

Algorithm 1, which is a competition based neural network learning algorithm henceforth called Learning Algorithm (LA), may be used by the learning and categorization system 38 to classify objects. The vector s(t) is the input vector at time t (t may correspond to the presented attention window which may be transformed from the original pixel representation to the vector s(t) in the transformed representation). Vector z(t) contains responses of neurons (i.e., components in FIG. 5). Algorithm 1 may learn continuously, if needed, through a reinitialization process.

---

Algorithm 1 (LA)

1: set: c = 400, age $n_j$ = 0, counters $m_{j,\,l}$ = 0 for all neurons and j and classes l; z = 0, the output of all neurons at time t = 0.
2: for t = 1, 2, ... n do
3:   y(t) = s(t)
4:   for i = 1, 2, ... c do
5:   Compute pre-response of neuron i from bottom-up connections:

$$\hat{z} = \frac{w_{bi}(t) \cdot y(t)}{\|w_{bi}(t)\| \|y(t)\|},$$

6:   end for
7:   Simulating lateral inhibition, decide the winner: j = arg $\max_{1 \le i \le c} \{\hat{z}_i(t)\}$.
8:   Update the winner's counter: $m_{j,\,l} \leftarrow m_{j,\,l} + 1$ if m(t) = l, i.e., the label m(t) (or its estimate for a reinitialized neuron) corresponds to the class l.
9:   The 3 × 3 neighboring cells are also considered as winners and added to the winner set J for the subsequent updating of the weights $w_b$.
10: The winner set J may still contain neurons with zero pre-responses $\hat{z}$. Define a sub-set J' ⊆ J, such that the response $z_j = \hat{z}_j$ if $\hat{z}_j \ne 0$. ∀ j ∈ J'.
11: Compute μ($n_j$) amnesic function:

$$\mu(n_j) = \begin{cases} 0 & \text{if } n_j \le t_1, \\ c(n_j - t_1)/(t_2 - t_1) & \text{if } t_1 < n_j \le t_2, \\ c + (n_j - t_2)/r & \text{if } t_2 < n_j, \end{cases}$$

where plasticity parameters (e.g., $t_1$ = 20, $t_2$ = 200, c = 2, r = 2000).
12: Update neuron age $n_j$ (j ∈ J'): nj ← nj + 1 and weights of winners j ∈ J':
$w_{bj}(t) = w_1 w_{bj}(t-1) + w_2 z_j y(t)$
where scheduled plasticity is determined by its two age-dependent weights $w_1$, $w_2$:
$w_1 = (n_j - 1 - \mu(n_j))/n_j$, $w_2 = (1 + \mu(n_j))/n_j$,
Alternatively, the fixed values of $w_1$ and $w_2$ can be used (e.g., $w_1$ = 1.0 anw $w_2$ = 0.003).
13: for all 1 ≤ i ≤ c, i ∉ J', $w_{bi}(t) = w_{bi}(t-1)$.
14: end for

---

Neurons or components may need to be replaced or reinitialized in the course of continued operation to relax memory or computational constraints. The neurons in Algorithm 1 may loose their ability for a major adaptation because of the dynamics of weights $w_1$ and $w_2$. Indeed, the neurons may become conservative in responding to new data because over time $w_2$ approaches 1/r, while $w_1$ approaches 1-1/r.

Neuron regeneration can be introduced in the Algorithm 1. The neuron with the youngest age can be periodically reinitialized over a sufficiently large time window. The reinitialized neuron could have its weights $w_b$ (or its template) set to the current input image, and its parameters to $w_1$=0 and $w_2$=1.

In Algorithm 1, the counters $m_{j,1}$ can be used for assigning labels to unknown images. For an example of a two-class problem (1=2), if $m_{j,1} > m_{j,2}$ for the winning neuron j, then the image belongs to class 1, otherwise to class 2. This labeling step may be useful if a high-confidence label can not be assigned either based on the relative position or based on relative speed of the detected object.

Figure 7:
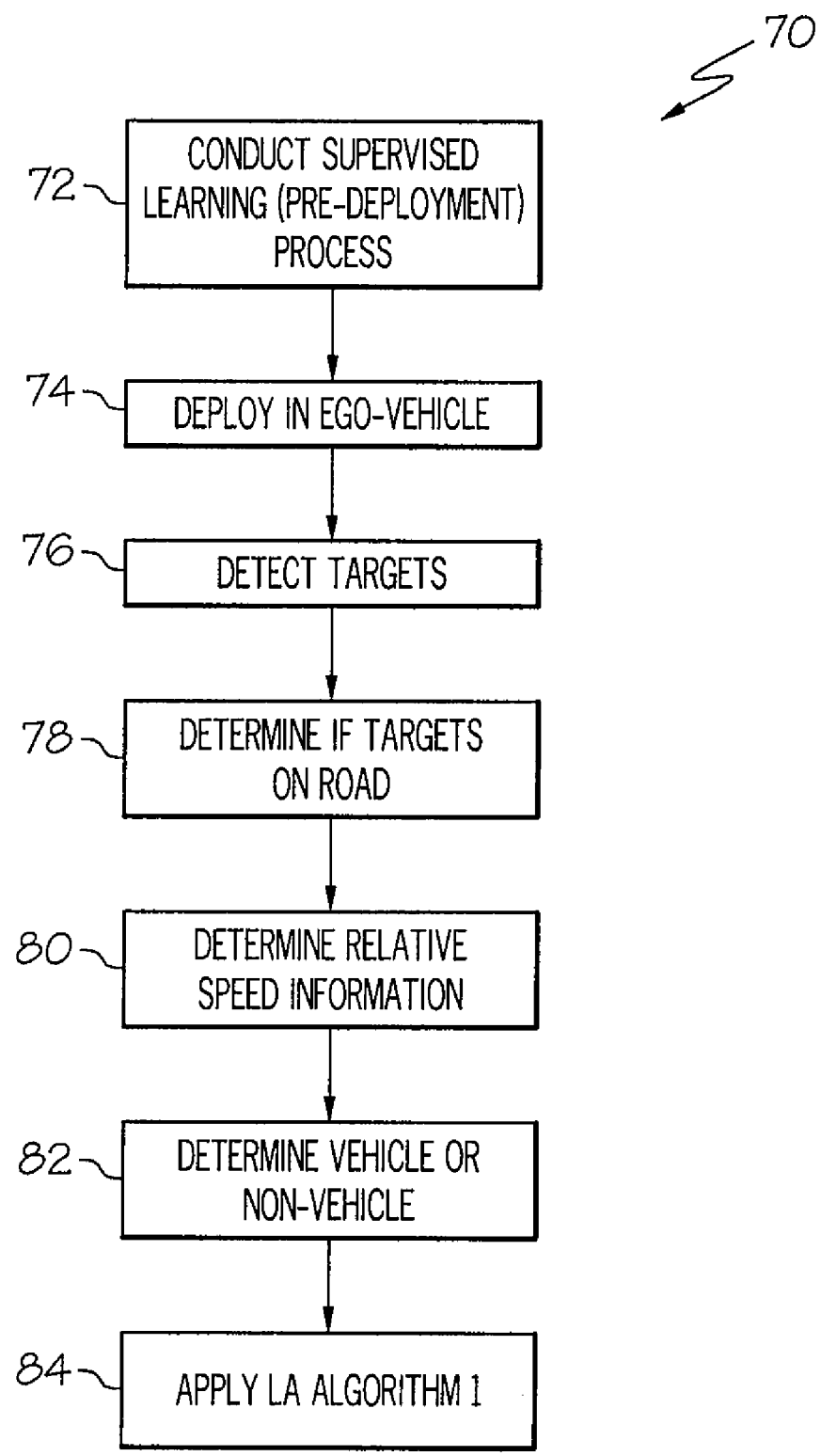
FIG. 7 is a schematic illustrating an embodiment of a process for learning and categorization.

FIG. 7 illustrates a process 70 for object detection and self-learning. At step 72, a supervised (e.g., off-line or pre-deployment) learning process is carried out for the learning and categorization system 38. Although Algorithm 1 can be an unsupervised system, the individual counters of FIG. 5 may be associated with each class of objects.

At step 74, the ego-vehicle is deployed with the object detection system 10. Possible targets are detected at step 76 using the remote sensing system 12. At step 78, it is determined whether the targets detected are on the road using the map information 15, GPS 16 and IMU 18. At step 80, it is determined whether the targets are moving using relative speed information. At step 82, the fuzzy logic decision system of FIG. 6 and comparison of counters of FIG. 5 for each class of objects may be used to determine whether the targets are vehicles or non-vehicles. Algorithm 1 may be used at step 84 to classify the targets and for self-learning.

The systems and processes described above may be implemented using software running on an applicable processor. The software may be coded in any suitable programming language and may be embodied in any of a range of computer-readable media including, but not limited to, floppy disks, hard disks, CDs, zip disks and DVDs. The learning algorithms may be implemented in hardware.

System performance was examined under the condition of introduced labeling errors in Algorithm 1. The results indicate that performance in the presence of mislabeling errors is robust and exhibits marginal degradation. Specifically, zoomed images were introduced to the system with a specified probability of its corresponding label to be changed to that of the opposite class. The training with such mislabeling was carried out for up to 12,000 steps (presentations of images), repeating the experiment 100 times to assure statistical significance of observed results. The Table below shows example performance:

TABLE

Example Performance

| | # of Training Steps | |
|---|---|---|
| Mislabeling Rate | 6000<br>Error Rate (total/$\alpha$/$\beta$), % | 12000<br>Error Rate (total/$\alpha$/$\beta$), % |
| 0 | 1.5/0.7/0.8 | 1.5/0.7/0.9 |
| 10% | 1.5/0.6/0.9 | 1.5/0.6/0.9 |
| 20% | 1.9/1.0/0.9 | 1.7/0.7/1.0 |
| 30% | 3.6/1.2/2.4 | 2.3/0.7/1.6 |

While particular embodiments and aspects have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method of object classification, comprising:
generating an image using a natural imaging system;
detecting an object displayed in the image using a remote sensing system;
mapping a return of the remote sensing system with the image;
comparing the image to a plurality of templates, each template having an associated label;
determining which of the plurality of templates is a closest match to the image represented in pixel or transformed space based on performing a competition based neural network learning algorithm (LA) and reinitializing one or more neurons; and
assigning the label to the image associated with a template of the plurality of templates determined to be the closest match to the image represented in pixel or transformed space.

2. The method of claim 1 further comprising varying an angle of view of a video camera of the natural imaging system to zoom in on the object detected by the remote sensing system.

3. The method of claim 2, wherein the step of varying the angle of view of the video camera includes narrowing the angle of view by optically zooming the video camera.

4. The method of claim 3, wherein optically zooming the video camera comprises optically zooming the video camera by a predetermined zoom factor.

5. The method of claim 1 further comprising updating one or more counter associated with a winning neuron.

6. The method of claim 1 further comprising determining if the object is on a road using map information and/or a global positioning unit for automatic labeling of the image.

7. The method of claim 1 further comprising determining a relative speed of the object for automatic labeling of the image.

8. The method of claim 1 further comprising updating one or more templates using the image.

9. An object classification system, comprising:
a natural imaging system that generates an image;
a remote sensing system that detects an object displayed in the image using a remote sensing system;
a computer-implemented algorithm that maps a return of the remote sensing system with the image; and
a self-learning and categorization system including logic that (i) compares the image represented in pixel or transformed space to a plurality of templates, each template having an associated label, (ii) determines which of the plurality of templates is a closest match to the image represented in pixel or transformed space, (iii) assigns the label to the image associated with a template of the plurality of templates determined to be the closest match to the image represented in pixel or transformed space and (iv) performs a competition based neural network learning algorithm (LA) and reinitializes one or more neurons.

10. The object classification system of claim 9, wherein the learning and classification system comprises a plurality of components, where each component has an associated template and an associated label.

11. The object classification system of claim 10, wherein each component has one or more counters associated therewith.

12. The object classification system of claim 9 further comprising map information and/or a global positioning unit used to determine if the target object is on a road for automatic labeling of the image.

13. The object classification system of claim 9, wherein the learning and categorization system comprises logic for performing a competition based neural network learning algorithm (LA) during which one or more neurons are reinitialized.

14. The object classification system of claim 9, wherein the natural imaging system comprises a video camera having an optical zoom that zooms in on the object to generate the image.

15. The object classification system of claim 14, wherein the video camera is a first video camera and the image is a first image, the natural imaging system comprising a plurality of video cameras such that, during operation, a second video camera provides a second image having a relatively wide angle of view and the first camera provides the first image having a relatively narrow angle of view.

16. A vehicle comprising an image classification system, the vehicle comprising:
- a global positioning unit;
- a remote detection system configured to provide a return for a target object within a range of the remote detection system;
- a natural imaging system including a video camera for providing an image of the target object;
- a computer-implemented algorithm that associates the return of the remote detection system with the image of the natural imaging system using a perspective mapping transformation;
- a self-learning and categorization system that classifies the image using information from the global positioning unit; and
- map information used by the learning and categorization system for classifying the image.

17. The vehicle of claim 16 further comprising an inertial measurement unit that provides information to the learning and categorization system for classifying the image.

18. The vehicle of claim 16, wherein the video camera has an optical zoom for zooming in on the target object to provide the image.

19. The vehicle of claim 16 further comprising a fuzzy logic decision system for automatic labeling of the image.

20. The vehicle of claim 16 further comprising counters for automatic labeling of the image.

* * * * *